W. R. STONE.
EVENER GEAR ATTACHMENT FOR COTTON PICKERS.
APPLICATION FILED JAN. 6, 1921.

1,391,866.

Patented Sept. 27, 1921.

INVENTOR:
Walter R. Stone.
BY
Chandler Chandler
ATTORNEYS.

UNITED STATES PATENT OFFICE.

WALTER R. STONE, OF INMAN, SOUTH CAROLINA.

EVENER-GEAR ATTACHMENT FOR COTTON-PICKERS.

1,391,866.      Specification of Letters Patent.    Patented Sept. 27, 1921.

Application filed January 6, 1921. Serial No. 435,497.

*To all whom it may concern:*

Be it known that I, WALTER R. STONE, a citizen of the United States, residing at Inman, in the county of Spartanburg, State of South Carolina, have invented certain new and useful Improvements in Evener-Gear Attachments for Cotton-Pickers; and I do hereby declare the following to be a full, clear, and exact description of the invention, such as will enable others skilled in the art to which it appertains to make and use the same.

The object of the invention is to provide an attachment for the evener shaft or spindle of a breaker, intermediate or finisher picker as a means of providing for the use at both ends of the shaft or spindle of gears or pinions of the same construction and dimensions, or more particularly to provide means whereby the necessary relative adjustment of the parts of the evener to secure the proper position of the arbor of the lap roll, may be secured by the use of stock gears at both ends of the shaft or spindle of the evener mechanism instead of employing a special lug gear as in the present practice, to avoid the necessity of keeping such special gears in stock for replacement in the event of breakage or injury to such gears in the operation of machines of this type, and with this object in view, the invention consists in a construction and combination of parts of which a preferred embodiment is shown in the accompanying drawing, wherein:

Figure 1:
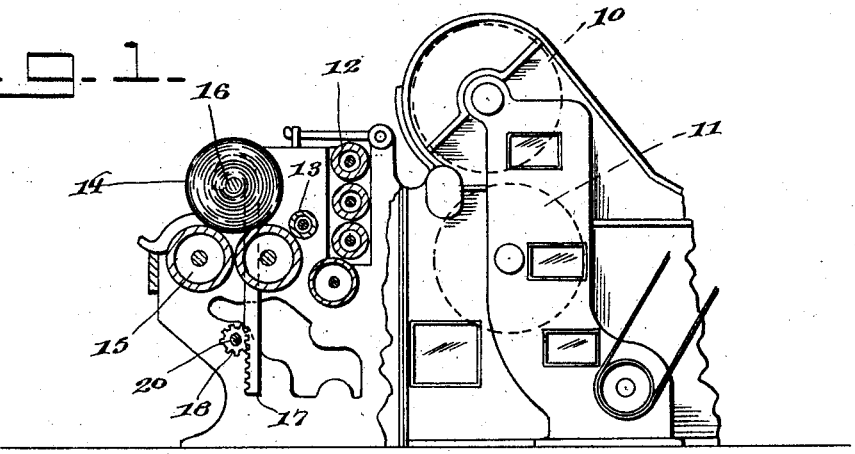
Figure 1 is a side view partly in section of the delivery end of a breaker, intermediate or finisher picker fitted with an attachment embodying the invention.
Figure 2:
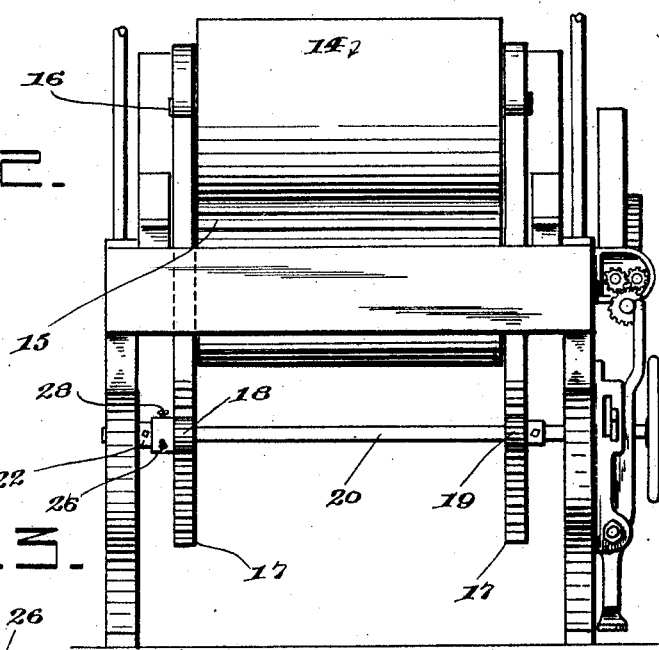
Fig. 2 is an end view of the same.
Figure 3:
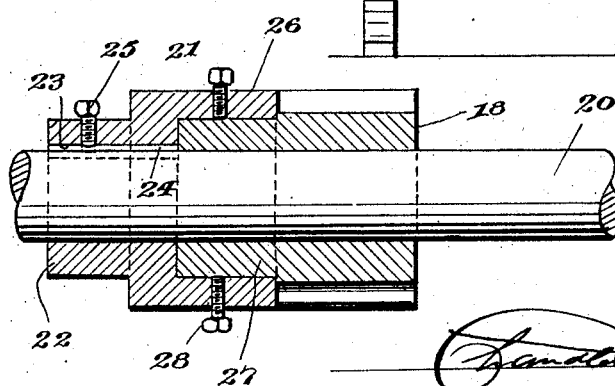
Fig. 3 is a detail end view of the attachment.

In machines of the type indicated the cotton vat after leaving the picker or other treating means passes between the revolving cages 10 and 11 and thence between the calender rolls 12 and under the press roll 13 prior to being wound to form the lap roll 14 which rests upon the fluted rolls 15 and is weighted or held in firm frictional contact therewith by the engagement with the arbor 16 thereof by an evener device consisting of rack bars 17 engaged by gears 18 and 19 located at opposite sides of the machine and carried by a common shaft or spindle 20. In the operation and more especially in the adjustment of the parts of the evener, in order to secure a proper bearing of the lap roll upon the fluted rolls, it is necesary to provide for a relative adjustment of the gears 18 and 19, and whereas in the usual practice it is common to employ an ordinary gear at one end of the shaft or spindle as shown at 19, the necessary relative adjustment is effected by employing at the other end of the shaft or spindle a special or what is known in the art as a lug gear having means by which the toothed element of the gear may be angularly adjusted with relation to the hub or sleeve by which the gear is attached to the shaft or spindle, and it is in order to avoid the necessity of using such a special construction of gear while maintainig the advantages incident to the relative adjustment of the coöperating gears at opposite ends of the shaft or spindle, that I have provided a sleeve 21 having at one end a reduced collar 22 designed to fit the shaft or spindle and having an interior groove or keyway 23 for the reception of a key 24 on the shaft or spindle, together with a set screw 25 for locking the sleeve against longitudinal displacement, the other end of the sleeve having a relatively enlarged cylindrical cuff 26 provided with a bore which is of larger diameter than the shaft or spindle and is adapted to receive the collar 27 of the gear 18 which is of the ordinary construction or corresponds in construction with the gear 19 employed at the opposite end of the shaft or spindle. The cuff is provided with a smooth bore and carries preferably a plurality of set screws 28 of which the inner ends are adapted to impinge upon the surface of the collar 27 of the gear 18 to lock the latter at any desired angular adjustment, and hence with its teeth in such relation to those of the gear 19 as to equalize the tension upon the arbor of the lap roll.

There being no appreciable wear or strain upon the sleeve, it is obvious that it will serve indefinitely as a means of maintaining the related gear 18 in its proper position upon the shaft or spindle while allowing for the necessary angular adjustment of the latter, and that when the gear becomes worn or damaged in use it may be replaced from stock in the same manner as the gear at the other end of the shaft or spindle and hence at an expense which is very much less than that required for the replacement of a special or lug gear such as is usually employed in this connection.

What is claimed is:

1. An adjustable gear attaching means for the shaft or spindle of the evener mechanism of a breaker or like picker, consisting of a sleeve provided with means for attachment to said shaft or spindle and having a socket for the revoluble reception of the collar of a stock gear.

2. An adjustable gear attaching means for the shaft or spindle of the evener mechanism of a breaker or like picker, consisting of a sleeve provided with means for attachment to said shaft or spindle and having a socket for the revoluble reception of the collar of a stock gear, said sleeve having a relatively reduced collar fitting and having an interlocking engagement with the shaft or spindle and a relatively enlarged cuff of which the bore is adapted to receive the collar of the gear.

3. An adjustable gear attaching means for the shaft or spindle of the evener mechanism of a breaker or like picker, consisting of a sleeve provided with means for attachment to said shaft or spindle and having a socket for the revoluble reception of the collar of a stock gear, said sleeve having means for interlocking engagement with the shaft or spindle and a gear receiving cuff carrying radially disposed set screws for terminal impingement upon the surface of the gear collar fitted therein.

In testimony whereof I affix my signature, in the presence of two witnesses.

WALTER R. STONE.

Witnesses:
H. E. CHAPMAN,
R. B. BLACKWELL.